United States Patent [19]

Khan et al.

[11] 4,380,618
[45] Apr. 19, 1983

[54] BATCH POLYMERIZATION PROCESS

[75] Inventors: Ausat A. Khan, Newark, Del.; Richard A. Morgan, Vienna, W. Va.

[73] Assignee: E. I. Du Pont de Nemours and Company, Wilmington, Del.

[21] Appl. No.: 295,019

[22] Filed: Aug. 21, 1981

[51] Int. Cl.$^3$ .......................... C08F 2/00; C08F 14/18
[52] U.S. Cl. ..................................... 526/206; 526/247; 526/249; 526/253; 526/254; 526/255
[58] Field of Search ............... 526/206, 255, 247, 249, 526/253, 254

[56] References Cited

U.S. PATENT DOCUMENTS

| | | | |
|---|---|---|---|
| 2,559,751 | 7/1951 | Berry et al. | 526/206 |
| 3,132,124 | 5/1964 | Couture et al. | 526/254 |
| 3,825,577 | 7/1974 | Lalu et al. | 260/435 |
| 4,025,709 | 5/1977 | Blaise et al. | 526/225 |

Primary Examiner—Harry Wong, Jr.

[57] ABSTRACT

In the batch process for copolymerizing tetrafluoroethylene and selected comonomers to prepare a copolymer thereof, the improvement which comprises employing a perfluoroalkylethane sulfonic acid or its salts as the dispersing agent.

11 Claims, No Drawings

BATCH POLYMERIZATION PROCESS

BACKGROUND

The batch copolymerization of tetrafluoroethylene (TFE) and copolymerizable fluorinated ethylenically unsaturated comonomers in the presence of a dispersing agent is known. However, it is desirable to improve upon this copolymerization by increasing the reaction rate and by incorporating greater amounts of comonomer into the copolymer.

Due to the higher reactivity of tetrafluoroethylene (TFE) compared to some comonomers, it has been difficult to achieve high levels of comonomer incorporation into melt-processible copolymers with TFE at reasonably rapid batch polymerization rates. Accordingly, the ability to incorporate more of such comonomers, particularly the comonomer hexafluoropropylene, into TFE copolymers is advantageous since certain resin physical properties are a function of comonomer content. Furthermore, it is desirable to produce TFE homopolymer and TFE copolymers of small particle sizes for certain applications such as coatings and the like.

SUMMARY OF THE INVENTION

It has now been discovered that if a selected perfluoroalkyl ethane sulfonic acid or its salt is employed as the dispersing agent, the total monomer conversion and the productivity in batch polymerization of the TFE/-comonomer polymerization to make melt-processible copolymers is increased and the amount of comonomer incorporated into TFE copolymer is increased, particularly when the comonomer is hexafluoropropylene.

In addition, it has now been found that when a selected perfluoroalkyl ethane sulfonic acid or its salt is employed as the dispersing agent, smaller size polymer particles are formed when employed to make TFE homopolymer or nonmelt-processible TFE copolymers.

Specifically, one aspect of this invention can be described as follows: In the batch process for preparing melt-processible copolymers of tetrafluoroethylene and at least one copolymerizable fluorinated ethylenically unsaturated comonomer by polymerizing tetrafluoroethylene and at least one said comonomer in an aqueous polymerization medium containing a free-radical initiator and 0.01–0.5 percent by weight dispersing agent, preferably 0.05–0.1 percent, based on weight of aqueous medium, the improvement which comprises employing as the dispersing agent (1) a mixture of compounds of the formula

wherein n is a cardinal number of between 2-8 and the average value of n is between 3 and 6 or (2) a compound of said formula wherein n is a cardinal number selected from between 2-6; and Y is —SO$_3$M wherein M is a cation having a valence of 1.

Another aspect of this invention can be described as follows: In the batch process for preparing tetrafluoroethylene homopolymer or nonmelt-processible copolymers of tetrafluoroethylene and at least one copolymerizable fluorinated ethylenically unsaturated comonomer by feeding tetrafluoroethylene alone or with at least one said comonomer into an aqueous polymerization medium containing a free-radical initiator and 0.01 to 0.5 percent dispersing agent based on weight of aqueous medium, the improvement which comprises employing as the dispersing agent (1) a mixture of compounds of the formula

wherein n is a cardinal number of between 2-8 and the average value of n is between 3-6, or (2) a compound of said formula wherein n is a cardinal number selected from 2-6; and M is a cation having a valence of 1.

DESCRIPTION OF THE INVENTION

The

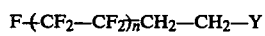

dispersing agent employed in the reaction is most readily available as a mixture of compounds in which n is a cardinal number of 2-8 with an average value of about 4. The average can be between 3-6, but 4 is most commonly available. The cation M employed in the functional group denoted as Y in the formula is preferably hydrogen, ammonium or an alkali metal, and most preferably is H$^+$, NH$_4^+$, Na$^+$, Li$^+$ or K$^+$.

Representative copolymerizable fluorinated ethylenically unsaturated comonomers are represented by the formulas

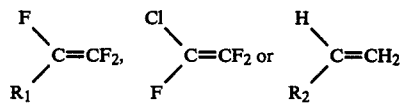

wherein R$_1$ is —R$_f$, —R$_f$X, —O—R$_f$ or —O—R$_f$X in which R$_f$ is a perfluoroalkyl radical of 1-12 carbon atoms, —R$_f$' is a linear perfluoroalkylene diradical of 1-12 carbon atoms in which the attaching valences are at each end of the linear chain, and X is H or Cl; and R$_2$ is R$_f$ or —R$_f$X.

Representative copolymerizable fluorinated ethylenically unsaturated comonomer includes hexafluoropropylene, perfluorohexene-1, perfluorononene-1, perfluoro(methyl vinyl ether), perfluoro(n-propyl vinyl ether), perfluoro(n-heptyl vinyl ether), perfluoromethyl ethylene, perfluorobutyl ethylene, ω-hydroperfluoropentene-1, 3-hydroperfluoro(propyl vinyl ether), and the like, or mixtures thereof such as a mixture of hexafluoropropylene and perfluoro(propyl vinyl ether). Preferably the comonomers are selected from perfluoro(alkyl vinyl ethers) of the formula R$_f$—O—CF=CF$_2$; or perfluoro(terminally unsaturated olefins) of the formula R$_f$—CF=CF$_2$; or perfluoroalkyl ethylenes of the formula R$_f$—CH=CH$_2$, wherein R$_f$ is alkyl of 1-5 carbon atoms.

Comonomer content in the TFE/comonomer copolymers can range from 0.005 mole percent up to about 20 mole percent, and more than one comonomer can be present. Thus the TFE/comonomer copolymers comprise both melt-processible TFE copolymer and nonmelt-processible TFE copolymer classes. The comonomer content is low enough that the copolymers are plastics rather than elastomers, i.e., they are partially crystalline and after extrusion do not exhibit a rapid retraction to original length from a stretched condition of 2× at room temperature.

The aqueous batch dispersion polymerization of TFE by itself or with various comonomers is well known.

The reaction medium consists of water, monomers, a dispersing agent, a free-radical polymerization initiator, and, optionally, an unreactive fluorocarbon phase to promote monomer diffusion or to solubilize the initiator and a chain transfer agent such as a low molecular weight hydrocarbon. A high molecular weight hydrocarbon wax of very low water solubility is sometimes used to reduce coagulation of the dispersion during polymerization.

Polymerization temperatures between 20°–140° C. may be employed and pressures of 1.4–7.0 MPa are ordinarily used. Generally higher temperatures and pressures are employed to promote polymerization rate, especially if a comonomer is unreactive relative to TFE. The TFE and sometimes the comonomer are fed continuously to the reaction vessel to maintain reaction pressure, or in some instances the comonomer is all added initially and pressure is maintained with TFE feed only. The monomer(s) are fed until the desired final dispersion solids level (15–50%) is achieved. The agitator speed in the reaction vessel may be held constant during polymerization or it may be varied to control diffusion and thus polymerization rate.

Initiators commonly employed are free-radical initiators such as ammonium or potassium persulfate or disuccinic acid peroxide. The dispersing agent will be present in an amount between 0.01–0.5 percent based on weight of aqueous medium and preferably between 0.05–0.1 percent.

By the term "melt-processible" it is meant that the copolymer can be processed (i.e., fabricated into shaped articles such as films, fibers, tubes, wire coatings and the like) by conventional melt extruding means. Such requires that the melt viscosity at the processing temperature be no more than $10^7$ poise. Preferably it is in the range of $10^3$ to $10^7$ poise, and most preferably $10^4$ to $10^6$ poise.

Melt viscosities of the melt-processible polymers were measured according to American Society for Testing and Materials test D-1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 KPa (6.5 pounds per square inch). The melt viscosity in poises is calculated as 53170 divided by the observed extrusion rate in grams per minute.

The relatively low molecular weight melt-processible copolymers require that the comonomer contents be high enough to assure good resin physical properties such as flexural strength. Generally, for perfluoro(alkyl vinyl ethers), this amount will be at least 0.4 mole percent of the copolymer, and can be up to about 3.6 percent. Preferably the amount will be about 1.0–1.6 percent and the ether will be perfluoro(propyl vinyl ether) (PPVE). Generally, for the perfluoro(terminally unsaturated olefin), the amount will be at least about 5 mole percent of the copolymer, and can be up to about 15 mole percent. Preferably the amount will be about 6–9 mole percent and the olefin will be hexafluororpropylene (HFP).

The HFP content in the melt-processible TFE/HFP copolymers described herein was determined by measurement of the ratio of the IR absorbance at 10.18 $\mu$m to the absorbance at 4.25 $\mu$m. This ratio is referred to as the HFP index or HFPI. Standard samples of known HFPI values were also run and a small correction was made, if necessary, to the test sample HFPI value. The mole percent HFP present is equal to 2.1 times the HFPI. Approximately 0.05 mm thick compression molded films were scanned under a nitrogen atmosphere.

The PPVE content in the melt-processible TFE/PPVE copolymers described herein was also determined by Infrared Spectroscopy. The ratio of absorbance at 10.07 $\mu$m to that at 4.25 $\mu$m was determined using approximately 0.05 mm thick compression molded films. This ratio was then used to determine percent PPVE by means of a calibration curve established with standard films of known PPVE content.

The analysis for PPVE and HFP in TFE/PPVE/HFP terpolymer is similar to that described above for the copolymers. However, the HFP and PPVE absorbances severely overlap so that computerized deconvolution is necessary to estimate the individual absorbances. The deconvoluted absorbances are then used to determine comonomer concentrations similarly to that described above.

By the term "nonmelt-processible" is meant a tetrafluoroethylene polymer or copolymer whose melt viscosity is so high that the polymer cannot be easily extruded by melt fabrication techniques. Generally the higher the molecular weight of the polymer, the higher the melt viscosity. A melt viscosity above which tetrafluoroethylene polymers or copolymers are nonmelt-processible is $1 \times 10^9$ poises. The melt viscosities of nonmelt-processible polymers are so high that molecular weights are usually measured indirectly by a procedure which gives the standard specific gravity (SSG) of the resin. The SSG of the resin varies inversely with molecular weight; as the molecular weight increases, the numerical value of the SSG decreases. The SSG values reported for the examples herein were determined by the procedure described in U.S. Pat. No. 3,142,665 except that 12 gram, instead of 3.5 gram, void-free chips of the same diameter were employed.

The presence of comonomer in a PTFE copolymer tends to depress the resin melting point and thus its use temperature. The nonmelt-processible copolymers contain only small amounts of comonomer to assure maintenance of a high melting point. Preferedly the level of comonomer in these nonmelt-processible copolymers is 0.01 to 0.30 mole percent.

The analysis of the very low HFP levels in the nonmelt-processible copolymers is accomplished by determining the ratio of IR absorbance at 10.18 $\mu$m to that at 10.70 $\mu$m. This ratio is then multiplied by 0.21 to obtain the mole percent HFP in the resin.

According to the present invention, higher levels of comonomer incorporation into the TFE copolymer are possible at a constant polymerization rate when the employed dispersing agent is a selected perfluoroalkylethane sulfonic acid or its salts.

Nonmelt-processible PTFE homopolymers are generally used as coatings. A small raw dispersion particle size is advantageous in certain coatings applications. The use of perfluoroalkyl ethane sulfonic acid (or salts thereof) as the dispersing agent in the aqueous dispersion polymerization of PTFE homopolymer affords smaller raw dispersion particle sizes than do heretofore employed surfactants. The raw dispersion particle sizes (average particle diameters) were measured by the light scattering procedure disclosed in U.S. Pat. No. 3,391,099.

EXAMPLE 1 AND COMPARISON

A cylindrical, horizontally disposed, water-jacketed, paddle-stirred, stainless steel reactor having a length to diameter ratio of about 1.5 and a water capacity of 80 parts was charged with 55 parts of water and the desired type and level of dispersing agent shown in Table I. The mixture was heated to 65° C. and then the reactor was evacuated and purged with TFE. The reactor temperature was then raised to 95° C. and agitation begun at 40–42 rpm. The reactor was pressured to the desired level (370–420 psig or 2.6–2.9 MPa) with HFP and then to 600 psig (4.1 MPa) with TFE. A freshly prepared solution (1.32 parts) of 0.0175 M ammonium persulfate initiator was added to the reactor at the rate of 0.11 parts/minute to initiate polymerization kickoff and then a 0.023 to 0.024 M potassium persulfate initiator solution was added at the rate of 0.022 parts/minute for the remainder of the batch. After polymerization starts, as indicated by an 0.07 MPa (10 psig) pressusre drop, additional TFE was added to the reactor at the rate of 0.09 parts/minute until completion of the polymerization (final solids levels of 21–24 percent were obtained). The agitator speed was varied as required to maintain a constant 600 psig (4.1 MPa) pressure level.

At the end of the reaction, the TFE feed and the agitator were turned off. Cooling water was circulated through the reactor jacket and the reactor was vented. The addition of initiator solution was stopped, the reactor was purged of any residual monomer with nitrogen, and the aqueous copolymer dispersion discharged. The dispersion was coagulated by vigorous stirring to obtain a TFE/HFP copolymer fluff which was dried before analyses were carried out.

Example 1 and comparison A are summarized in Table I. The higher HFP content obtained using the sulfonate dispersing agents of this invention (relative to the use of ammonium perfluorocaprylate) are demonstrated in the Table.

ether) (PPVE) and 345 mL of Freon® F-113 ($CCl_2FCClF_2$) were sucked into the clave. The agitator was turned on and the contents were heated to 80° C. The autoclave was pressured to 2.1 MPa with TFE and simultaneously a solution of 1.5 g of ammonium persulfate (APS) dissolved in 500 mL of demineralized water was pumped into the clave. After polymerization kickoff had occurred (0.07 MPa drop in pressure), additional PPVE and a solution of 1.2 g of APS in 1000 mL of water were pumped to the clave for the remainder of the polymerization at the rates of 1.10 mL/minute and 10 mL/minute, respectively. The agitator speed was varied to control the reaction so that 50 g per minute of additional TFE was needed to maintain a constant 2.2 MPa pressure. After 7 kg of TFE had been added (measured after kickoff), the TFE and PPVE feeds were stopped and the agitator was turned off. The initiator solution (APS) continued to be pumped until the clave was vented of unreacted monomer. The coagulated polymer was dried at 150° C. Analysis by infrared spectroscopy showed it contained 1.17 mole percent PPVE. Its melt viscosity at 372° C. was $4.0 \times 10^3$ poise.

The identical procedure to the above was followed except that the perfluoroalkylethane sulfonate was replaced by the same weight of ammonium perfluorocaprylate. In this case, polymer PPVE content was found to be only 0.61 mole percent and the melt viscosity was $6.8 \times 10^4$ poise.

EXAMPLE 3

Into a clean, stainless steel, horizontal, agitated autoclave having a volume of 36 liters was charged 24.5 kg of demineralized water. The autoclave was closed, evacuated, purged three times with TFE and evacuated again. Ethane was introduced into the clave until a 30.4 kPa rise in pressure occurred. The vacuum in the clave was then used to suck in 45 mL of PPVE, 350 ML of Freon® F-113, and a solution of 40 g of a mixture of potassium perfluoroalkyl($C_4$–$C_{16}$)ethane sulfonates (Ave—$C_8$) dissolved in 500 mL of water. Then 1 kg of HFP was pressured into the clave and the mixture was heated to 80° C. with the agitator running at 50 rpm.

TABLE I

TFE/HFP COPOLYMERIZATIONS

| Examples or Comparison | Dispersing Agent Employed | Initiator Concentration | Dispersing Agent Wt. %* | Polymerization Temperature | HFP Partial Pressure | Agitator Speed | Mole Percent HFP in Polymer |
|---|---|---|---|---|---|---|---|
| Comparison A | Ammonium perfluorocaprylate | 0.0237m | 0.037% | 95° C. | 2.6 MPa | 32 rpm | 8.18 |
| Example 1 | Potassium salt of a mixture of $C_4$—$C_{16}$ perfluoroalkyl ethane sulfonates (Ave-$C_8$) | 0.0237m | 0.038% | 95° C. | 2.6 MPa | 31 rpm | 8.54 |

*As percent of final dispersion weight.

EXAMPLE 2

Into a clean, stainless steel, horizontal, agitated autoclave having a volume of 36 liters were placed 21.8 kg of demineralized water, 50.0 g of ammonium carbonate buffer and 45 g of a mixture of ammonium perfluoroalkyl($C_4$–$C_{16}$)ethane sulfonates (Ave—$C_8$). The autoclave was closed, evacuated, purged three times with tetrafluoroethylene (TFE) and evacuated again. Ethane was introduced into the clave until a 16.9 kPa rise in pressure occurred. Then 165 mL of perfluoro(propyl vinyl After the temperature had lined out at 80° C., the clave was pressured to 2.8 MPa with TFE. A solution of 1.7 g of APS in 300 mL of water was pumped into the clave over a 10 minute period and then a solution of 2.0 g/liter of APS in demineralized water was pumped to the clave at the rate of 9 mL/minute for the remainder of the reaction. When the pumping of the second APS solution was begun, a pump was also activated to add PPVE to the clave at the rate of 0.7 mL/minute. After polymerization kickoff had occurred, additional TFE was added to the clave to maintain the 2.8 MPa pressure. The agitator speed was adjusted so as to react 79 g of TFE per minute. After 8.7 kg of TFE (measured after kickoff) had reacted, the TFE and PPVE feeds were cut off. The agitator and initiator feeds were left on until the clave pressure dropped to 1.7 MPa. The feeds were then shut off and the clave was vented. The coagulated and dried polymer contained 2.38 mole percent HFP, a PPVE content of 0.34 mole percent, and had a melt viscosity of $6.6 \times 10^4$ poise.

EXAMPLE 4

A horizontally disposed, water/steam jacketed, cylindrical stainless-steel autoclave located in a barricade and having a capacity of 36 liters and a length-to-diameter ratio of about 1.5 to 1, and provided with a 4-bladed cage-type agitator running the length of the autoclave, was evacuated and then charged with 340 g of paraffin wax, 21.8 kg of demineralized water, 27 g of a mixture of $C_4$–$C_{16}$ perfluoroalkyl ethane sulfonic (Ave—$C_8$) acids dissolved in 198 g of water, 0.044 g of iron powder, and 0.044 g of copper powder. The autoclave was then heated to 65° C., evacuated and purged with tetrafluoroethylene, after which 15 g disuccinic acid peroxide dissolved in about 100 mL water and then 25 mL of hexafluoropropylene were added. The autoclave temperature was set at 88° C. and the agitator was turned on. When the temperature reached the set point, the autoclave was pressured up with TFE to 350 psig (2.4 MPa). After "kickoff" (0.07 MPa drop in pressure), the clave temperature and pressure were raised to 90° C. and 2.8 MPa, respectively. TFE was then fed to the autoclave to maintain the reaction pressure at 2.8 MPa until a total of 11.8 kilograms of TFE had been added to the autoclave. The TFE feed was then cut off and the pressure was allowed to decrease to 1.2 MPa before the agitator was stopped and the vapor space of the reactor was vented. The polymerization time from kickoff to the time feed was turned off was 87 minutes.

The resulting dispersion was discharged from the autoclave and cooled, after which the supernatant solid paraffin wax was removed. The dispersion contained about 35.6 percent solids and had a raw dispersion particle size of 0.105 μm on average. The coagulated polymer had a SSG value of 2.215 and a HFP content of 0.078 mole percent. A control using ammonium perflurocaprylate as the dispersing agent contained 0.074 mole percent HFP.

EXAMPLE 5

A horizontally disposed, water/steam jacketed, cylindrical stainless-steel autoclave located in a barricade and having a capacity of 36 liters and a length-to-diameter ratio of about 1.5 to 1, and provided with a 4-bladed cage-type agitator running the length of the autoclave, was evacuated and then charged with 855 g of paraffin wax, 22.0 kg of demineralized water, 30 g of potassium perfluoroalkyl ethane sulfonate (Ave—$C_8$) dispersing agent, and 0.044 g of iron powder. The autoclave was then heated to 65° C., evacuated and purged with tetrafluoroethylene, after which 15 g disuccinic acid peroxide dissolved in about 100 ml water and 0.6 g of methanol in 100 ml of water were added. The autoclave temperature was then set to 90° C. and the agitator speed was started at 46 rpm. The autoclave was pressured to 380 psig (2.6 MPa) with TFE starting when the temperature was 80° C. The TFE was added slowly (3–5 minutes) so that the temperature was just 90° C. when the pressure-up was completed. Reaction occurred and after the pressure had dropped to 300 psig (2.1 MPa) ("kick-off"), TFE was fed to the autoclave to maintain the reaction pressure at 335 psig (2.3 MPa) until a total of 11.8 kilograms of TFE had been added to the autoclave. The TFE feed was then cut off and the pressure was allowed to decrease to 175 psig (1.2 MPa) before the agitator was stopped and the vapor space of the reactor was vented. The polymerization time from kickoff to the time feed was turned off was 103 minutes.

The resulting dispersion was discharged from the autoclave and cooled, after which the supernatant solid paraffin wax was removed. The dispersion contained about 35.0 percent solids and had a raw dispersion particle size of 0.150 μm on average. The coagulated polymer had an SSG value of 2.218. A control which employed ammonium perflurocaprylate as the dispersing agent produced a dispersion having a raw dispersion particle size of 0.175 μm on average.

We claim:

1. In the batch process for preparing tetrafluoroethylene homopolymer or copolymers of tetrafluoroethylene and at least one copolymerizable fluorinated ethylenically unsaturated comonomer of the formula

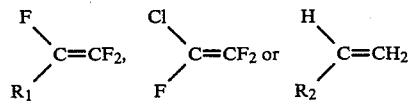

wherein $R_1$ is —$R_f$, —$R_f X$, —O—$R_f$, or —O—$R_f X$ in which $R_f$ is a perfluoroalkyl radical of 1–5 carbon atoms, —$R_f$ is a linear perfluoroalkylenediradical of 1–5 carbon atoms in which the attaching valences are at each end of the linear chain, and X is H or Cl; and $R_2$ is —$R_f$ or $R_f X$, by polymerizing tetrafluoroethylene alone or with at least one said comonomer present in an amount sufficient to produce a comonomer unit content in the copolymer of between 0.005 mole percent and 20 mole percent, in an aqueous polymerization medium containing a free-radical initiator and 0.01–0.5 percent dispersing agent, based on weight of aqueous medium, the improvement which comprises employing as the dispersing agent 1) a mixture of compounds of the formula

wherein n is a cardinal number of between 2–8 and the average value of n is between 3–6, or 2) a compound of said formula wherein n is a cardinal number selected from 2–6, and M is a cation having a valence of 1.

2. The process of claim 1 wherein tetrafluoroethylene homopolymer is prepared by polymerizing tetrafluoroethylene alone.

3. The process of claim 1 wherein tetrafluoroethylene copolymers are prepared by polymerizing tetrafluoroethylene and at least one comonomer recited therein.

4. The process of claim 3 wherein the comonomer has the formula

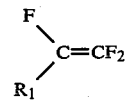

wherein $R_1$ is $R_f$.

5. The process of claim 3 wherein the comonomer has the formula

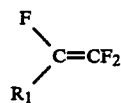

wherein $R_1$ is —O—$R_f$.

6. The process of claim 3 wherein the comonomer has the formula

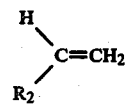

wherein $R_2$ is —$R_f$.

7. The process of claim 4 wherein the comonomer is hexafluoropropylene.

8. The process of claim 5 wherein the comonomer is perfluoropropylvinyl ether.

9. The process of claim 3 wherein the comonomer is a mixture of hexafluoropropylene and perfluoropropylvinyl ether.

10. The process of claim 6 wherein the comonomer is perfluorobutyl ethylene.

11. The process of claims 1, 2, 3, 4, 5, 6, 7, 8, 9 or 10 wherein M is $H^+$, $NH_4^+$, $Na^+$, $Li^+$, or $K^+$.